US007876380B2

(12) United States Patent
Chen et al.

(10) Patent No.: US 7,876,380 B2
(45) Date of Patent: *Jan. 25, 2011

(54) SYSTEM AND METHOD OF TRANSMISSION AND RECEPTION OF PROGRESSIVE CONTENT WITH ISOLATED FIELDS FOR CONVERSION TO INTERLACED DISPLAY (75) Inventors: Sherman (Xuemin) Chen, San Diego, CA (US); Alexander G. MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/753,307

(22) Filed: May 24, 2007

(65) Prior Publication Data

US 2007/0280358 A1 Dec. 6, 2007

Related U.S. Application Data (63) Continuation of application No. 10/349,634, filed on Jan. 22, 2003, now Pat. No. 7,236,207.

(60) Provisional application No. 60/351,182, filed on Jan. 22, 2002, provisional application No. 60/384,234, filed on May 30, 2002, provisional application No. 60/441,072, filed on Jan. 17, 2003.

(51) Int. Cl.
*H04N 7/01* (2006.01)
*H04N 11/20* (2006.01)

(52) U.S. Cl. .................. 348/459; 348/446; 348/911; 348/443; 348/441

(58) Field of Classification Search ................ 348/441, 348/459, 446, 443, 445, 447, 448, 911, 97, 348/558; 386/131
See application file for complete search history.

(56) References Cited

U.S. PATENT DOCUMENTS 5,365,273 A 11/1994 Correa et al.
5,390,135 A 2/1995 Lee et al.

(Continued)

FOREIGN PATENT DOCUMENTS

EP 0762772 3/1997

(Continued)

OTHER PUBLICATIONS

Inoue et al., "An Area-Effective Datapath Architecture for Embedded Microprocessors and Scalable Systems", IEICE Transactions on Electronics, Institute of Electronics Information and Comm. Eng., Tokyo, JP, vol. E84-C No. 8, Aug. 2001, pp. 1014-1020, XP001107636 ISSN: 0916-8524.

(Continued)

*Primary Examiner*—David L Ometz
*Assistant Examiner*—Jean W Désir
(74) *Attorney, Agent, or Firm*—McAndrews Held & Malloy, Ltd.

(57) ABSTRACT

Systems and methods of coding progressive content with isolated fields for conversion to interlaced display are provided. Some systems and methods may find use in, for example, digital video compression systems and methods. Film material may be encoded as video material with an intended field polarity and an explicit 3:2 pull-down operation for interlaced display (e.g., a 30-frames-per-second display).

24 Claims, 7 Drawing Sheets

U.S. PATENT DOCUMENTS

| | | |
|---|---|---|
| 5,446,497 A | 8/1995 | Keating et al. |
| 5,461,420 A | 10/1995 | Yonemitsu et al. |
| 5,757,435 A | 5/1998 | Wells |
| 5,771,357 A | 6/1998 | Kato et al. |
| 5,781,184 A | 7/1998 | Wasserman et al. |
| 5,943,251 A | 8/1999 | Jiang et al. |
| 5,982,444 A | 11/1999 | Kato et al. |
| 6,011,869 A | 1/2000 | Ohta et al. |
| 6,069,664 A | 5/2000 | Zhu et al. |
| 6,111,610 A | 8/2000 | Faroudja |
| 6,118,491 A | 9/2000 | Wu et al. |
| 6,222,589 B1 | 4/2001 | Faroudja et al. |
| 6,441,813 B1 | 8/2002 | Ishibashi |
| 6,670,996 B2 | 12/2003 | Jiang |
| 6,839,094 B2 * | 1/2005 | Tang et al. .......... 348/607 |
| 6,867,814 B2 | 3/2005 | Adams et al. |
| 6,987,767 B2 * | 1/2006 | Saito .......... 370/394 |
| 7,224,734 B2 * | 5/2007 | Suzuki et al. .......... 375/240.02 |
| 7,236,207 B2 * | 6/2007 | Chen et al. .......... 348/459 |
| 2002/0075412 A1 * | 6/2002 | Tang et al. .......... 348/607 |

FOREIGN PATENT DOCUMENTS

| | | |
|---|---|---|
| EP | 1182889 | 2/2002 |
| EP | 1603340 | 12/2005 |
| WO | 02/100110 | 12/2002 |

OTHER PUBLICATIONS

Text of Committee Draft of Joint Video Specification (ITU-T Rec. H-264 ISO/IEC 14496-10 AVC) MPEG02/N4810, ISO/IEC JTC1/SC29/WG11 MPEG02/N4810, Fairfax, USA, May 2002, pp. I-X,1, XP001074690.

* cited by examiner

**FIG. 1
(Prior Art)**

| Film mode states | Transmitted Fields | Repeat First Field Flag | Top Field First Flag | Displayed Field |
|---|---|---|---|---|
| A | A1 | 0 | 1 | A1 |
|   | A2 |   |   | A2 |
| B | B1 | 1 | 1 | B1 |
|   | B2 |   |   | B2 |
|   |    |   |   | B1 |
| C | C1 | 0 | 0 | C2 |
|   | C2 |   |   | C1 |
| D | D1 | 1 | 0 | D2 |
|   | D2 |   |   | D1 |
|   |    |   |   | D2 |

SYSTEM AND METHOD OF TRANSMISSION AND RECEPTION OF PROGRESSIVE CONTENT WITH ISOLATED FIELDS FOR CONVERSION TO INTERLACED DISPLAY

RELATED APPLICATIONS

This application is a continuation of U.S. patent application Ser. No. 10/349,634, entitled "System and Method of Transmission and Reception of Progressive Content With Isolated Fields for Conversion to Interlaced Display," filed on Jan. 22, 2003, issued as U.S. Pat. No. 7,236,207, which makes reference to, claims priority to and claims benefit from U.S. Provisional Patent Application Ser. No. 60/351,182, entitled "Method for Enabling Transmission and Display of Encoded Compressed Film Material in a Video Bit Stream" and filed on Jan. 22, 2002; U.S. Provisional Patent Application Ser. No. 60/384,234, entitled "Method for Enabling Transmission and Display of Encoded Compressed Film Material in a Video Bitstream" and filed on May 30, 2002; and U.S. Provisional Patent Application Ser. No. 60/441,072, entitled "Method for Enabling Transmission and Display of Encoded Compressed Film Material in a Video Bit Stream" and filed on Jan. 17, 2003.

This application is related to U.S. patent application Ser. No. 11/753,347, entitled "System and Method of Transmission and Reception of Progressive Content With Isolated Fields for Conversion to Interlaced Display", filed concurrently herewith.

INCORPORATION BY REFERENCE

The above-identified United States patent applications are hereby incorporated herein by reference in their entirety.

BACKGROUND OF THE INVENTION

In countries that use 525-line interlaced display systems such as, for example, the United States and Canada, television video signals are sampled and transmitted at approximately 59.94 fields per second (fps). For such countries, digital television video streams are generally encoded and transmitted by using a particular Moving Pictures Experts Group (MPEG) standard (e.g., MPEG-2 Video) at approximately 29.97 frames per second (FPS).

Hereinafter, an integral value of fps or an integral value of FPS may be an approximation including, within its scope, a range of equivalent values. Thus, for example, the expression 30 FPS may be used to refer to rates such as, for example, approximately 29.97 FPS or approximately 30 FPS. Furthermore, the expression 24 FPS may be used to refer to rates such as, for example, approximately 23.976 FPS or approximately 24 FPS. Similarly, the expression 60 fps may be used to refer to rates such as, for example, approximately 59.94 fps or approximately 60 fps.

Figure 1:
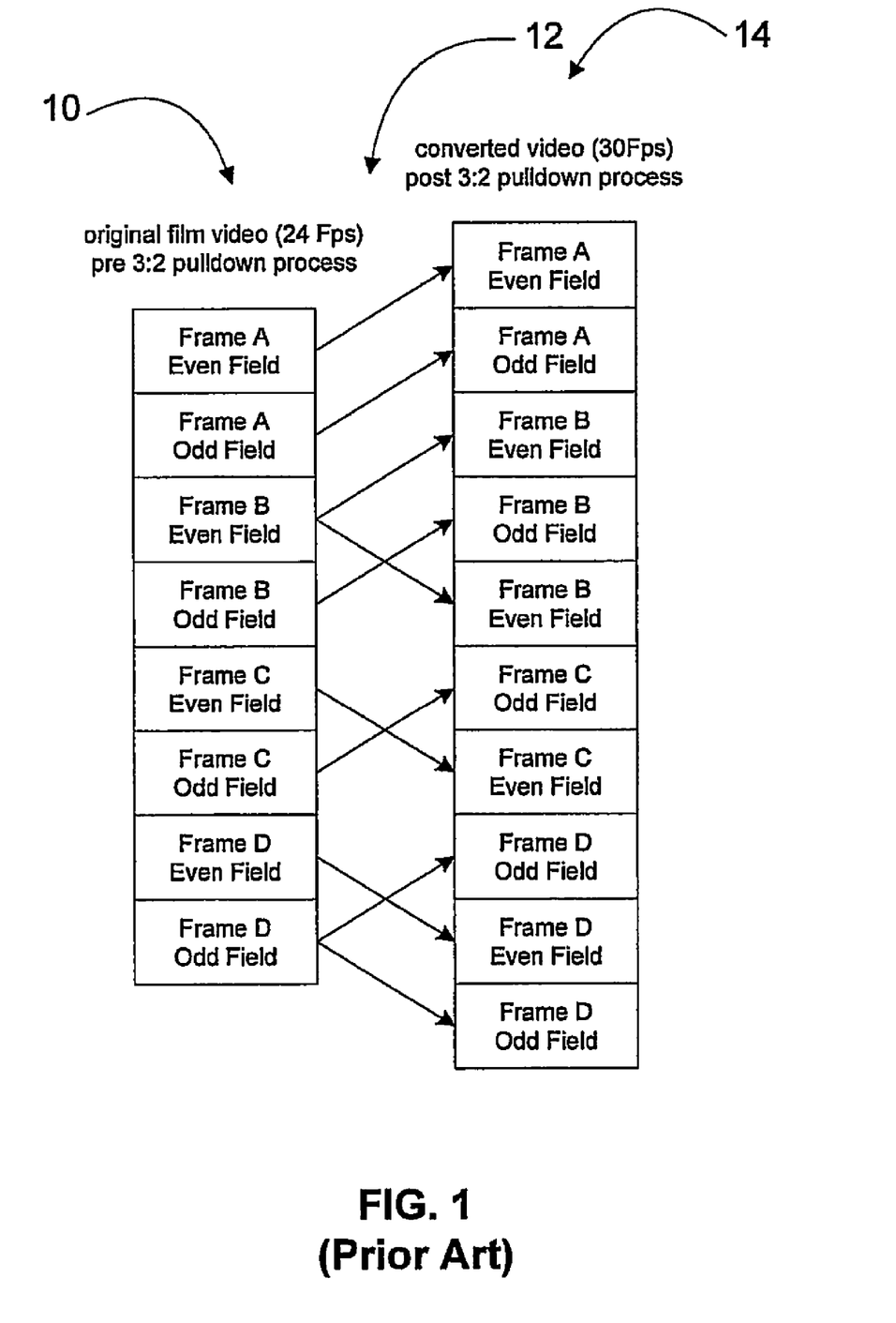
FIG. 1 illustrates an embodiment of a 3:2 Pull Down process.

Film material produced at 24 FPS is routinely converted to 60 fps in many applications. Broadcast networks usually encode and transmit movies that were originally filmed at 24 FPS and not at 60 fps. However, at the receiver, the decoded video at 24 FPS is often converted to 60 fps for interlaced display. A conventional process for converting 24 FPS to 60 fps sampling includes the Telecine Process (named after the original type of machine used to perform the conversion from film to video). It is also known as the 3:2 pull-down process. The Telecine Process inserts repeated fields derived from the original film frames in such a way that 5 video frames (i.e., 10 fields) are produced for every 4 original film frames. FIG. 1 illustrates one example of a process 12 that performs a 3:2 pull-down. The original film sequence 10 filmed at 24 FPS is converted to a video sequence 14 at 30 FPS, or equivalently 60 fps. A mechanism of handling 3:2 pull-down for film material in digital video systems is usually referred as film mode.

The Telecine Process or 3:2 pull-down process is supported in the MPEG-2 Video compression standard. When using the MPEG-2 Video standard with the film mode, the frame rate encoded in the sequence header is 30 FPS for interlaced display, even though the video is actually coded as a 24 FPS film sequence. The encoder also conveys, to the decoder, proper display timing based on the frame rate of 30 FPS. The flags top_field_first and repeat_first_field in the picture coding extension header are used for indicating how a picture should be displayed. These two flags are mandated as MPEG-2 syntax elements that are carried all the time and are followed by decoder. However, such inflexibility may not be desirable, particularly, when the type of display device can vary from, for example, an interlaced television to a progressive monitor. Furthermore, the encoder does not know the type of display employed at the decoder end.

Figure 2:
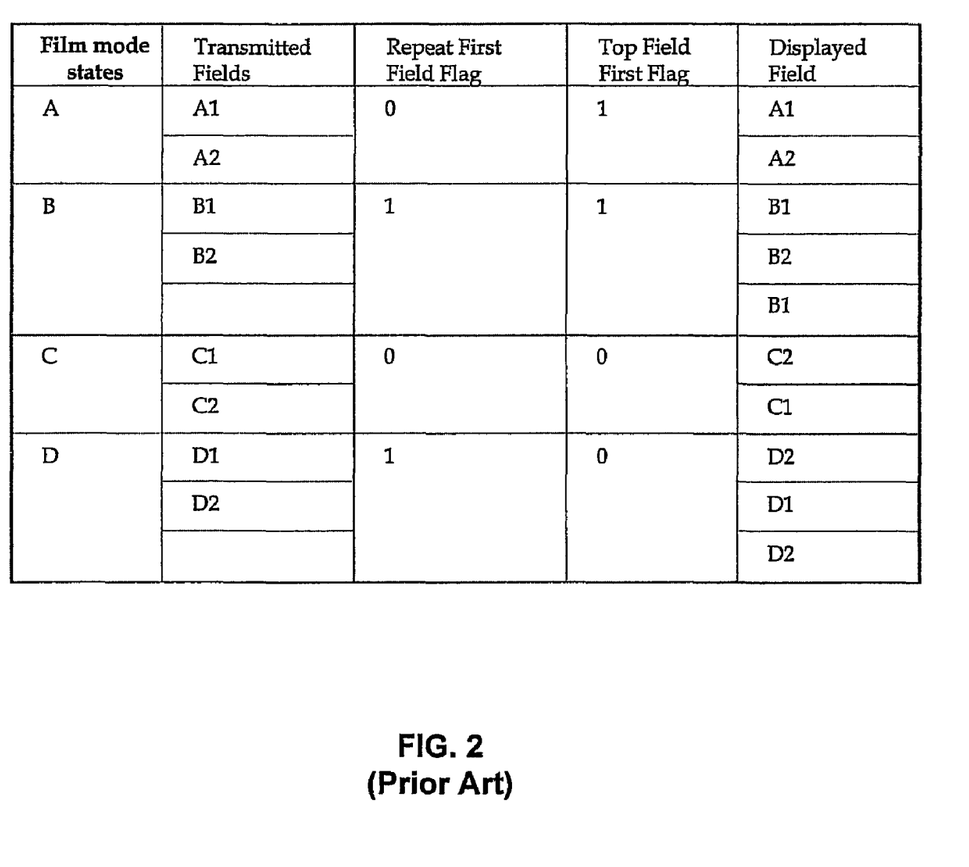
FIG. 2 illustrates an embodiment of a mapping between film mode states and 3:2 pull-down flags.

In MPEG-2 Video elementary streams, the flags top_field_first and repeat_first_field are used to indicate the current film state. Four film states A, B, C and D are illustrated in FIG. 1. The four possible film mode states are generally repeated in the same order every four pictures. FIG. 2 illustrates the mapping between the film states and these 3:2 pull-down flags in MPEG-2 Video.

In MPEG-2, the decoder generally follows the top_field_first and repeat_first_field flags to display film state B and D frames for three field times to reconstruct the 3:2 pull-down pattern. The decoder re-displays the first field to create the third field. This is because, in the 3:2 pull-down algorithm, the first field is repeated every other picture to convert film material at 24 FPS to video mode at 30 FPS. Film state A and C pictures are displayed for only two field times. A film mode sequence of four pictures will therefore be displayed as a total of 10 field times. In this way, the decoded video is displayed at the correct video picture rate of 30 FPS In MPEG-2, the flags top_field_first and repeat_first_field along with the frame rate can also be applied to derive Decoding Time Stamps (DTS) and Presentation Time Stamps (PTS) for some pictures. The flags (i.e., top_field_first and repeat_first_field) are used to achieve proper timing for decoding and displaying the coded 24 FPS film material to generate output video at 30 FPS.

However, for compressed video formats without these flags (or similar flags), the 3:2 pull-down process or the film mode is supported in a different manner and not supported by, for example, new video compression standards (e.g., MPEG-4 Advanced Video Coding (AVC)) as well as with some of the existing video transport standards (e.g., MPEG-2 Systems).

In formats other than those following the MPEG-2 Systems standard (i.e., ISO/IEC 13818-1), decoding time and presentation time may be indicated via syntax elements that differ from DTS specifications and PTS specifications found in MPEG-2 Systems. As used herein, the terms DTS and PTS may be interpreted as including, within their meaning, decoding time or buffer removal time and presentation time or display time, respectively, regardless of how they may be encoded in the bitstream.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Some aspects of the present invention may relate to a system and a method of encoding progressive content with isolated fields for conversion to interlaced display. Some applications within the scope of the present invention may find use, for example, in digital video compression systems and methods.

In one embodiment, the present invention may provide an encoder that is adapted to encode film material as video with an intended field polarity and an explicit 3:2 pull-down operation for interlaced display (e.g., a 30 FPS display). An isolated field with the intended field polarity (e.g., top field) may be coded between two frames to achieve 3:2 pull-down for coding the film material. The polarities of all fields of all frames may be inferred from the field polarities of the isolated fields since the field polarities alternate for normal interlaced display of video. Frames do not have to indicate field polarities; however, they may do so in video coding standards that support the indication of field polarity of frames. The field polarities of the frames may be implied by the polarities of the isolated fields.

In another embodiment, unlike in MPEG-2 Video, for example, the present invention may provide that DTS and PTS may be generated for both coded frames and fields in the encoder. The encoder may insert isolated fields as appropriate to achieve the desired decoding and display timing, for example, according to the result of a 3:2 pull-down process. In cases where the input to the encoder is the result of a 3:2 pull-down process, the encoder may encode progressive frames with interspersed isolated fields in a manner similar to the content that is received by the encoder. In the decoder, for coded pictures (e.g., frame pictures or field pictures) that do not have associated DTS and PTS in the stream, their decoding and presentation times may be derived from the decoding and presentation times of previous pictures (e.g., frame pictures or field pictures) by using the frame rate or the field rate indicated in the stream. In one example, the decoding and presentation times may be derived from the decoding and presentation times of previous pictures by using only the frame or the field rate indicated in the stream.

In yet another embodiment, unlike the MPEG-2 film mode flags, for example, the present invention may provide that its use does not complicate the video buffer model in the Hypothetical Reference decoder portion of the video standard, since the frame rate and buffer removal times are consistent with or without the use of film mode encoding.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some aspects of the present invention may relate to a system and a method that encodes progressive content with isolated fields for conversion to interlaced display. Some applications within the scope of the present invention may find use in, for example, digital video compression systems and methods. Some embodiments according to the present invention may be suitable for use in and compatible with some MPEG standards (e.g., an MPEG-4 AVC standard as described in, for example, document JVT-E146d37ncm.doc, entitled "Joint Video Specification (ITU-T Rec. H.264|ISO/IEC 14496-10 AVC)", incorporated herein by reference in its entirety).

Some aspects of the present invention may relate to providing a system and a method that realizes a 3:2 pull-down process or a film mode for at least some video compression systems and methods. Some embodiments according to the present invention may be suitable for use in and compatible with some MPEG standards (e.g., MPEG-4 AVC) including some existing video transport standards (e.g., MPEG-2 Systems).

Figure 4:
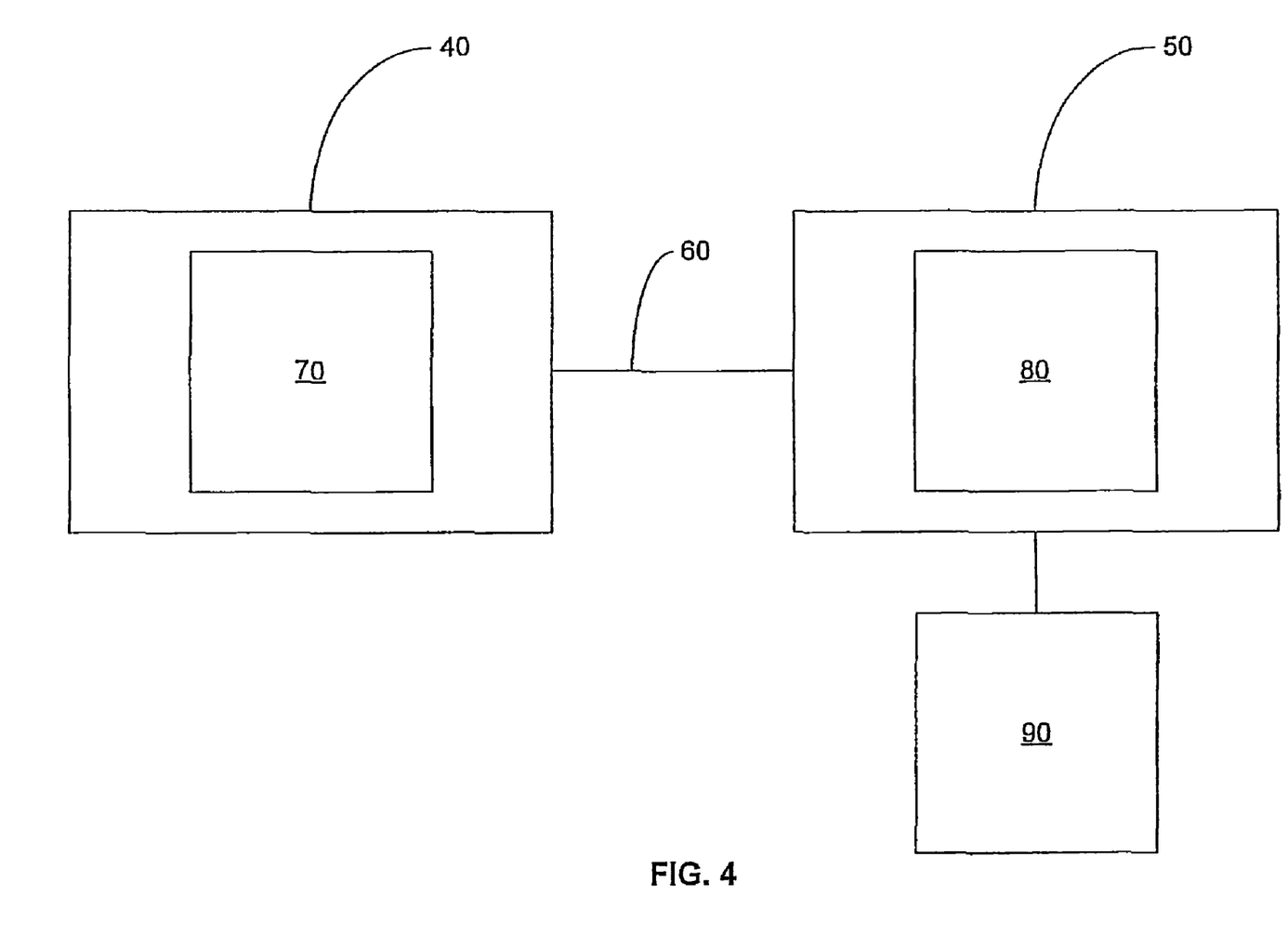
FIG. 4 illustrates an embodiment of a system that facilitates the display of video according to the present invention.
Figure 5:
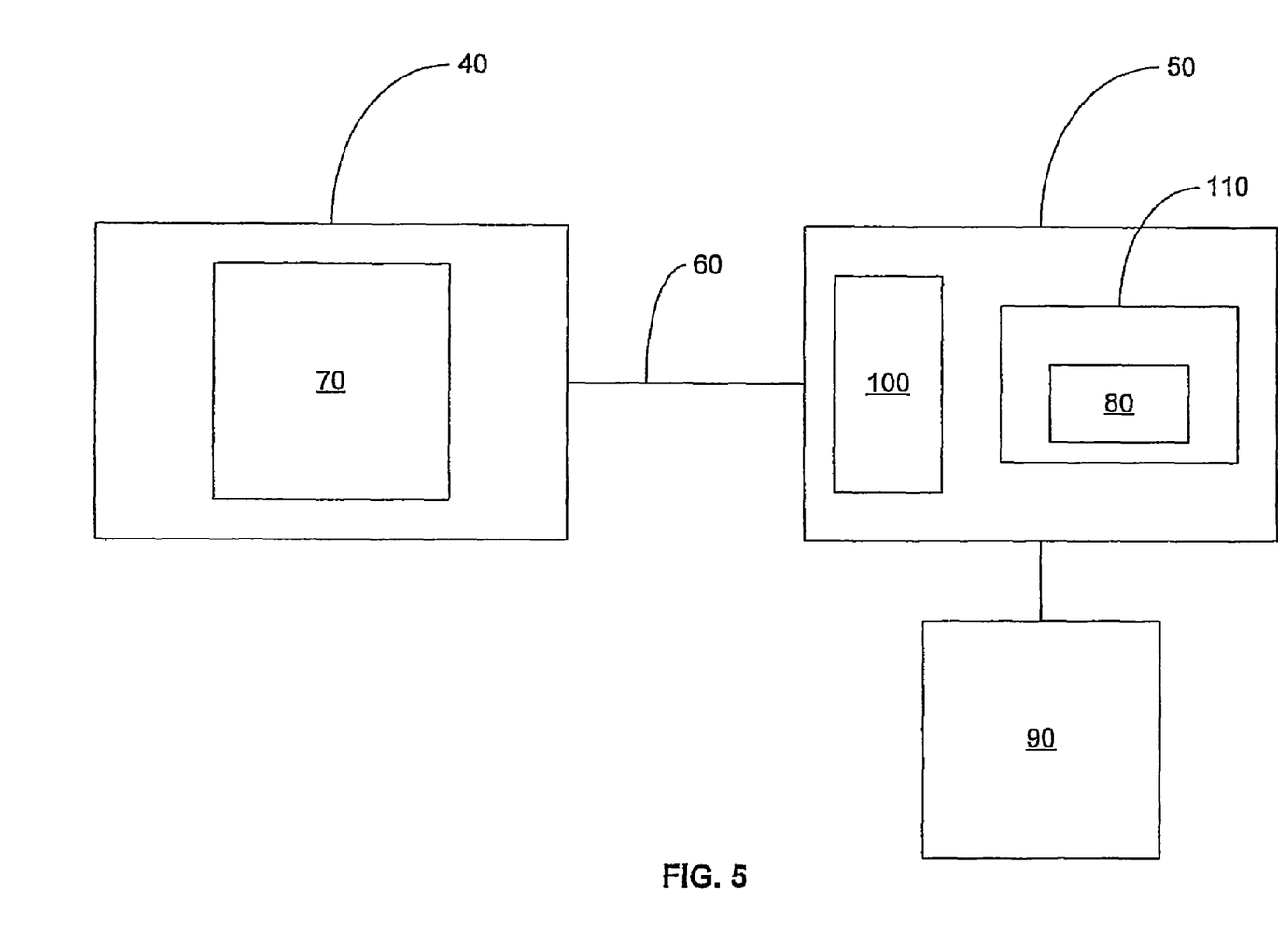
FIG. 5 illustrates an embodiment of a system that facilitates the display of video according to the present invention.

FIGS. 4 and 5 show respective block diagrams illustrating embodiments of systems that facilitate the display of video according to the present invention. Referring to FIG. 4, a transmitter 40 may be coupled to a receiver 50 via a network 60. The receiver 50 may, in turn, be coupled to a display 90. The transmitter 40 may include, for example, an encoder 70. The receiver 50 may include, for example, a decoder 80. FIG. 5 shows another embodiment for the receiver 50 including, for example, a transport processor 100 and a multimedia processor 110. In one embodiment, the transport processor 100 may be coupled to the network 60 and to the multimedia processor 110. The multimedia processor 110 may be coupled to the display 90 and may include, for example, the decoder 80. Although illustrated as part of the multimedia processor 110, the decoder 80 may be separate from the multimedia processor 110. Furthermore, although illustrated as separate components, the transport processor 100 and multimedia processor 110 may be integrated at least in part. In one embodiment, the transport processor 100 and the multimedia processor 110 form a single integrated chip. The present invention contemplates other degrees of integration and separation.

Figure 6:
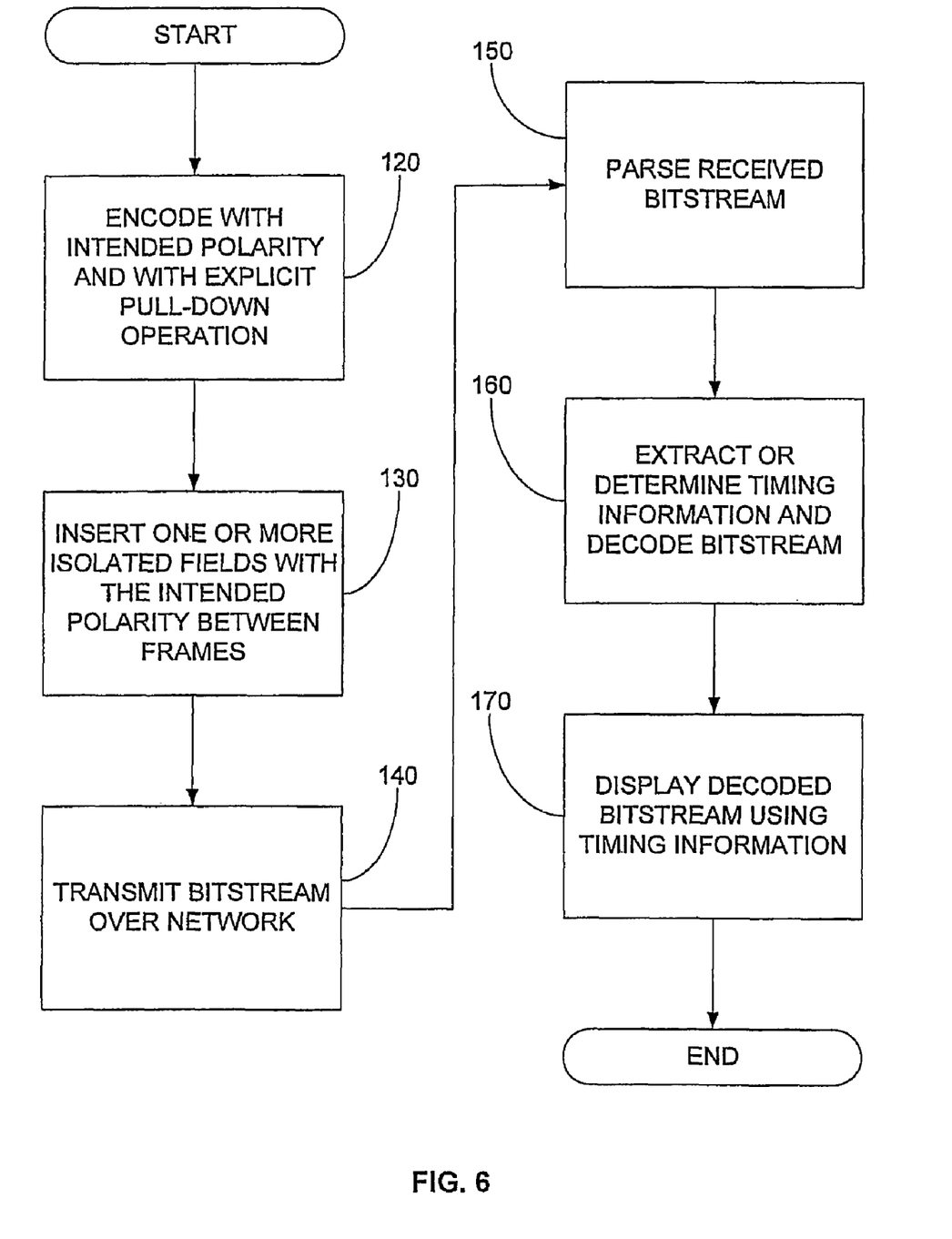
FIG. 6 illustrates a flowchart showing an embodiment of a process that facilitates the display of video according to the present invention.

FIG. 6 illustrates a flowchart showing an embodiment of a process that facilitates the display of video according to the present invention. In operation, in step 120, the encoder 70 of the transmitter 40 may encode, for example, film material as video material with an intended field polarity and with an explicit 3:2 pull-down operation for interlaced display via the display 90. In step 130, the encoder 70 may insert one or more isolated fields with the intended field polarity (e.g., a top field or a bottom field) between two frames to achieve 3:2 pull-down for coding the film material. The field polarities of the fields in all of the frames may be inferred from the field polarities of the isolated fields. In one embodiment, this may be because, for example, the field polarities alternate for normal interlaced video display. In step 140, the bitstream (e.g., a video bitstream) may be transmitted over a network (e.g., cable television, satellite, digital television, broadcast, Ethernet, Internet, wireless network, etc.) to the receiver 50. In step 150, the transport processor 100 may parse the received bitstream and may output the parsed bitstream to the multimedia processor 110. In step 160, the multimedia processor 110, which may include, for example, the decoder 80, may extract or may determine timing information and may decode the bitstream. If not present, the timing information for a particular frame or a particular field may be determined from the timing information from one or more previous frames or one or more previous fields. The multimedia processor 110 may use a frame rate or field rate indicated in the bitstream to determine timing information for a particular frame or a particular field. In step 170, the decoded bitstream may then be displayed on the display 90 using, for example, the extracted or determined timing information. For example, the multimedia processor 110 may use the time stamp information in determining the timing for displaying pictures (e.g., frame pictures, field pictures, etc.).

Compressed digital video may include, for example, coded frames and coded fields. According to the MPEG-2 Video standard (i.e., ISO 13818-2), coded fields occur in pairs (i.e., an isolated field is not allowed between two frames). Furthermore, each picture of a film mode sequence in MPEG-2 is always coded as a frame. In one embodiment, the isolated fields may be used to code some pictures in film mode. In another embodiment, the present invention may be used with the MPEG-4 AVC standard. An isolated field with the indicated field polarity (e.g., top field or bottom field) may be coded between, for example, two frames to achieve the 3:2 pull-down process for coding film material. The frames may or may not have the field order indicated explicitly. The order of the fields of the frames may be implied, for example, by the polarity of the isolated fields.

Figure 3:
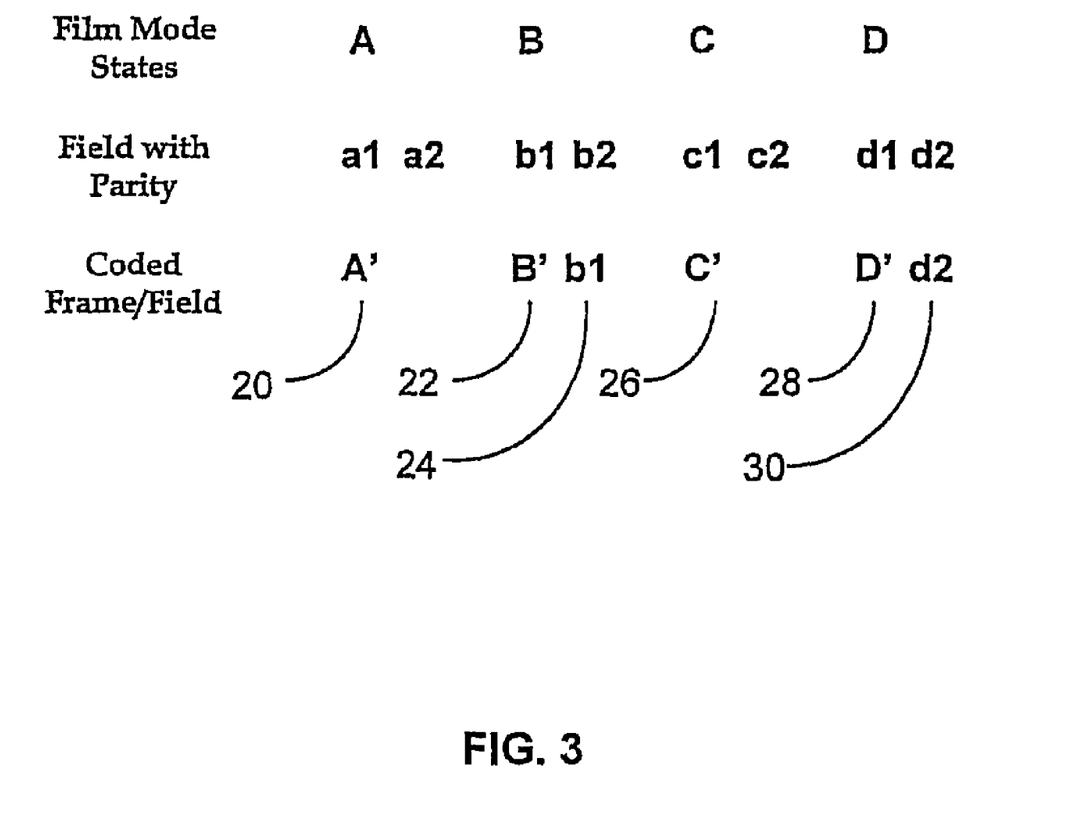
FIG. 3 illustrates an embodiment of a pattern of frames and fields according to the present invention.

The film mode states correspond, for example, to frame types A, B, C and D of the 3:2 pull-down process as illustrated in FIGS. 1 and 2. An embodiment of the operation of an encoder according to the present invention is illustrated in FIG. 3. For film mode state A, a picture 20 is coded as a frame whose top field precedes its bottom field in time. For film mode state B, a first picture 22 is coded as a frame whose top field precedes its bottom field in time followed by a second picture 24 coded as a field. The coded field in the second picture 24 represents the top field of the film mode state B. In one embodiment, it is predicted from the top field of the preceding frame picture in state B. For film mode state C, a picture 26 is coded as a frame whose bottom field precedes its top field in time. For film mode state D, a first picture 28 is coded as a frame whose bottom field precedes its top field in time followed by a second picture 30 coded as a field. This coded field represents the bottom field of the film mode state D. In one embodiment, it is predicted from the bottom field of the preceding frame picture in state D.

Figure 7:
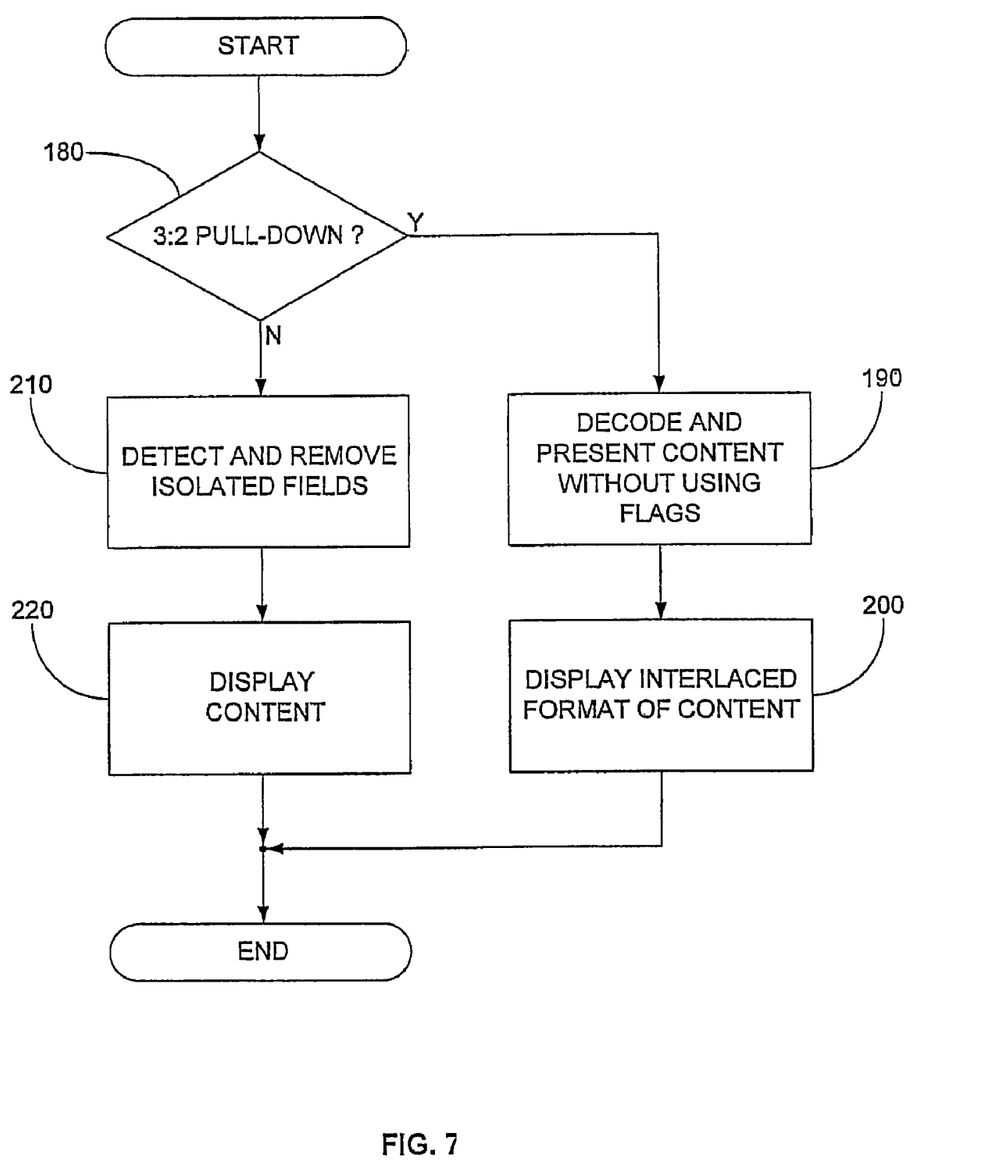
FIG. 7 illustrates a flowchart showing an embodiment of a decoding process according to the present invention.

Some embodiments of encoding and decoding methods for film mode according to the present invention may be well suited for supporting interlaced display. FIG. 7 shows a flowchart illustrating an embodiment of a decoding process according to the present invention. In query 180, the decoder determines whether or not the decoder selects 3:2 pull-down content (e.g., 30 FPS). The encoder may explicitly encode a 24 FPS film sequence into a 30 FPS (or, equivalently, 60 fields per second) video sequence for transmission. If the decoder chooses to use 3:2 pull-down format (e.g., the decoder may be coupled to an interlaced display with a format and a frame rate compatible with those indicated in the bitstream) then, in step 190, the encoded video sequence may be directly decoded and presented on the display without using the flags such as, for example, top_field_first and repeat_first_field as in MPEG-2 Video. The interlaced format of the content is displayed in step 200. If the decoder chooses not to use the 3:2 pull-down format then, in step 210, the decoder detects and removes the isolated fields. The decoder may choose not to use the 3:2 pull-down format if, for example, the decoder is coupled to a progressive display, or if a display has a different format or frame rate from those indicated in the bitstream. Such isolated fields may be detected by the decoder since, for example, the field is isolated and the field is predicted from a previous frame. In step 220, the coded frames may then be displayed in a progressive format or the content may be converted to match the display which may be, for example, interlaced with a different size or a frame rate from the rate resulting from the use of the isolated fields.

Even when a different video encoding specification from MPEG-2 is used to compress the video, it may still be desirable to use the MPEG-2 Systems specification (e.g., Transport Stream) to transmit the encoded bit stream, due to the wide use of equipment implementing this specification and its proven performance and reliability. It may also be desirable to maintain current investments in the transmission and delivery infrastructure.

In accordance with the present invention, film material may be encoded with the indicated frame rate being the interlaced display frame rate (e.g., 30 FPS) without using flags such as, for example, top_field_first and repeat_first_field. The time-stamping process for the decoding time stamp (DTS) and the presentation time stamp (PTS) in MPEG-2 Systems may be slightly different than that for MPEG-2 Video. For MPEG-2 Video, DTS and PTS are typically generated for coded frames in the encoder by examining the corresponding film states. In an MPEG-2 decoder when encountering frames that do not have DTS and PTS coded, the decoding and presentation times generally are derived from the decoding and presentation times of previous frames in combination with the frame rate and the repeat_first_field flag. However, unlike MPEG-2 Video, in some embodiments according to the present invention, DTS and PTS may be generated for coded pictures in the encoder without knowing the film mode states of the pictures. Also, unlike MPEG-2 Video, in some embodiments according to the present invention, DTS and PTS may be generated for either coded frame pictures or field pictures in which the field picture may be isolated (e.g., not necessarily in pairs). When a decoder encounters a picture without DTS and PTS coded in the stream, the decoder can infer the correct decoding and presentation times for that picture from the decoding and presentation times of previous pictures (e.g., frame pictures or field pictures) in combination with only using frame rate or field rate, without using a repeat_first_field flag or the equivalent.

Unlike the MPEG-2 film mode flags, some embodiments according to the present invention do not complicate the video buffer model in the Hypothetical Reference Decoder portion of the video standard, since the frame rate and buffer removal times are consistent with or without the use of a film mode.

In some embodiments, the present invention may not indicate any field polarity of the frames when the isolated fields are included. The field polarity of all of the frames may be determined by the polarities of the isolated fields.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A video decoder circuit comprising:
   circuitry operable to decode encoded film material that has been encoded with a field polarity and a 3:2 pull-down operation, where the encoded film material comprises inserted isolated fields; and
   wherein the circuitry is operable to decode the encoded film material and to present a video sequence without using a film mode flag.

2. The video decoder of claim 1, where the encoded film material comprises film mode flags.

3. The video decoder circuit of claim 1, wherein the circuitry is operable to decode the encoded film material comprising top_field_first and repeat_first_field flags and to present a video sequence without using the top_field_first and repeat_first_field flags.

4. The video decoder circuit of claim 1, wherein the circuitry is operable to determine a decoding timestamp for a particular picture without knowledge of a film mode state of the particular picture.

5. The video decoder circuit of claim 1, wherein the circuitry is operable to determine a presentation timestamp for a particular picture without knowledge of a film mode state of the particular picture.

6. The video decoder circuit of claim 1, wherein the circuitry is operable to determine field polarities of encoded frames based on polarities of the inserted isolated fields.

7. The video decoder circuit of claim 1, wherein the circuitry is operable to determine field polarities of encoded frames based solely on polarities of the inserted isolated fields.

8. The video decoder circuit of claim 1, where the encoded film material comprises coded frames and inserted isolated coded fields.

9. The video decoder circuit of claim 1, wherein the presented video sequence is for interlaced display.

10. A video decoder circuit comprising:
    circuitry operable to decode first encoded film material that has been encoded with a field polarity and a 3:2 pull-down operation, where the first encoded film material comprises inserted isolated fields;
    wherein the circuitry is operable to decode second encoded film material that has not been encoded with a field polarity and a 3:2 pull-down operation; and
    wherein the circuitry is operable to decode the first encoded film material and the second encoded film material at a frame rate and buffer removal times that are consistent between the first encoded film material and the second encoded film material.

11. The video decoder circuit of claim 10, wherein the circuitry is operable to determine a decoding timestamp for a particular picture of the first encoded film material without knowledge of a film mode state of the particular picture.

12. The video decoder circuit of claim 10, wherein the circuitry is operable to determine a presentation timestamp for a particular picture of the first encoded film material without knowledge of a film mode state of the particular picture.

13. The video decoder circuit of claim 10, wherein the circuitry is operable to determine field polarities of encoded frames of the first encoded film material based on the polarities of the inserted isolated fields.

14. The video decoder circuit of claim 10, wherein the circuitry is operable to determine field polarities of encoded frames of the first encoded film material based solely on the polarities of the inserted isolated fields.

15. The video decoder circuit of claim 10, wherein the circuitry is operable to derive timestamp information from presentation times of previous pictures of the first encoded film material and only the frame or the field rate indicated in the stream.

16. The video decoder circuit of claim 10, where the first encoded film material comprises coded frames and inserted isolated coded fields.

17. A video decoder circuit comprising:
    circuitry operable to decode encoded film material that has been encoded with a field polarity and a 3:2 pull-down operation, where the encoded film material comprises inserted isolated fields; and
    wherein the circuitry is operable to derive timestamp information from presentation times of previous pictures and a frame rate or a field rate indicated in a video stream.

18. The video decoder circuit of claim 17, wherein the circuitry is operable to derive timestamp information solely from presentation times of previous pictures and a frame rate or a field rate indicated in a video stream.

19. The video decoder circuit of claim 17, wherein the circuitry is operable to determine a decoding time or a presentation time for a particular picture based upon at least one decoding time stamp (DTS) or at least one presentation time stamp (PTS) for a previously decoded picture.

20. The video decoder circuit of claim 17, wherein the circuitry is operable to determine a decoding timestamp for a particular picture of the encoded film material without knowledge of a film mode state of the particular picture.

21. The video decoder circuit of claim 17, wherein the circuitry is operable to determine a presentation timestamp for a particular picture of the encoded film material without knowledge of a film mode state of the particular picture.

22. The video decoder circuit of claim 17, wherein the encoded film material comprises a repeat-field flag, and the circuitry is operable to derive decoding and presentation times without using the repeat-field flag.

23. The video decoder circuit of claim 17, where the encoded film material comprises coded frames and inserted isolated coded fields.

24. The video decoder circuit of claim 17, wherein the decoded film material is for interlaced display.

* * * * *